United States Patent
Morikawa et al.

(10) Patent No.: US 10,817,551 B2
(45) Date of Patent: Oct. 27, 2020

(54) METHOD FOR EXPANDING WORD, WORD EXPANDING APPARATUS, AND NON-TRANSITORY COMPUTER-READABLE RECORDING MEDIUM

(71) Applicant: Panasonic Intellectual Property Management Co., Ltd., Osaka (JP)

(72) Inventors: Koji Morikawa, Tokyo (JP); Yuki Minoda, Tokyo (JP); Asuka Sakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 330 days.

(21) Appl. No.: 15/943,742

(22) Filed: Apr. 3, 2018

(65) Prior Publication Data

US 2018/0307693 A1    Oct. 25, 2018

Related U.S. Application Data

(60) Provisional application No. 62/489,660, filed on Apr. 25, 2017.

(30) Foreign Application Priority Data

Sep. 1, 2017   (JP) .................................. 2017-168135

(51) Int. Cl.
*G06F 16/00*   (2019.01)
*G06F 16/332*   (2019.01)
(Continued)

(52) U.S. Cl.
CPC ...... *G06F 16/3322* (2019.01); *G06F 16/3329* (2019.01); *G06F 16/90335* (2019.01); *G06F 40/30* (2020.01)

(58) Field of Classification Search
CPC .............................. G06F 16/24; G06F 16/2453
See application file for complete search history.

(56) References Cited

U.S. PATENT DOCUMENTS

| | | | |
|---|---|---|---|
| 8,996,550 B2 * | 3/2015 | Ko ...................... | G06F 16/3322 707/758 |
| 2011/0161311 A1 * | 6/2011 | Mishne ............... | G06F 16/3322 707/719 |
| 2012/0173222 A1 | 7/2012 | Wang et al. | |

FOREIGN PATENT DOCUMENTS

| | | |
|---|---|---|
| JP | 7-325837 | 12/1995 |
| JP | 10-207896 | 8/1998 |

(Continued)

OTHER PUBLICATIONS

Alexander G. Huth et al., "Natural speech reveals the semantic maps that tile human cerebral cortex", nature, vol. 532, Apr. 27, 2016, pp. 453-458 and Supplemental Material.

*Primary Examiner* — Hung Q Pham
(74) *Attorney, Agent, or Firm* — Wenderoth, Lind & Ponack, L.L.P.

(57) ABSTRACT

A method for expanding a word performed by a processor includes (a) obtaining a first word, (b) obtaining, from a memory, a concept map that is unique to a user and that includes a plurality of second words and semantic distances between the plurality of second words, the plurality of second words including words belonging to different categories, (c) determining, if the plurality of second words include a word corresponding to the first word, the word corresponding to the first word as a basic word, (d) selecting, on the basis of the semantic distances to the basic word, at least one of the plurality of second words included in the concept map as an adjacent word, and (e) outputting a result of a search on the basis of the first word and the adjacent word.

13 Claims, 13 Drawing Sheets

(51) Int. Cl.
*G06F 16/903* (2019.01)
*G06F 40/30* (2020.01)

(56) References Cited

FOREIGN PATENT DOCUMENTS

| | | |
|---|---|---|
| JP | 2004-246824 | 9/2004 |
| JP | 2009-015795 | 1/2009 |
| JP | 2012-108959 | 6/2012 |
| JP | 2014-505939 | 3/2014 |
| JP | 2016-031675 | 3/2016 |
| JP | 2017-076193 | 4/2017 |
| WO | 2006/055120 | 5/2006 |

\* cited by examiner

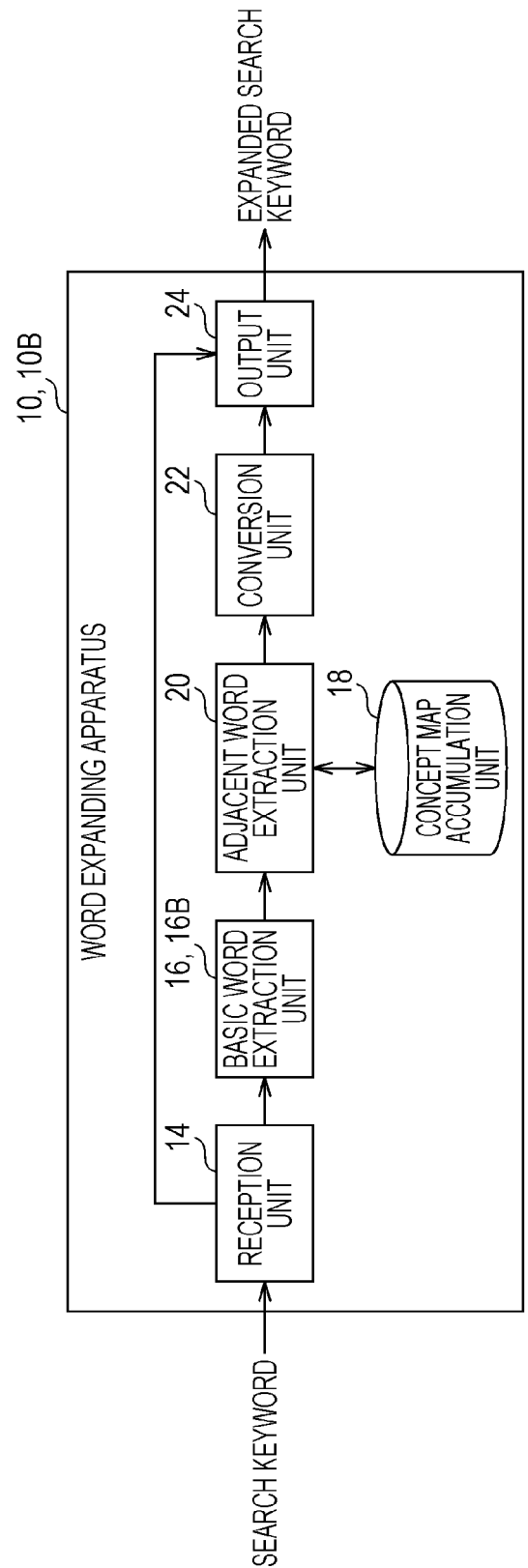

FIG. 4A

|  | home | rent | owner | house | park | place | car | weekend |
|---|---|---|---|---|---|---|---|---|
| home | 0 | 2 | 4 | 1 | 5 | 2 | 1 | 1 |
| rent | 2 | 0 | 3 | 2 | 4 | 2 | 5 | 2 |
| owner | 4 | 3 | 0 | 3 | 4 | 3 | 2 | 4 |
| house | 1 | 2 | 3 | 0 | 5 | 2 | 2 | 1 |
| park | 5 | 4 | 3 | 5 | 0 | 1 | 2 | 2 |
| place | 2 | 2 | 3 | 2 | 1 | 0 | 4 | 1 |
| car | 1 | 5 | 2 | 2 | 2 | 4 | 0 | 2 |
| weekend | 1 | 2 | 4 | 1 | 2 | 1 | 2 | 0 |

FIG. 4B

|         | home | rent | owner | house | park | place | car | weekend |
|---------|------|------|-------|-------|------|-------|-----|---------|
| home    | 0    | 3    | 2     | 1     | 5    | 2     | 1   | 5       |
| rent    | 3    | 0    | 5     | 3     | 6    | 2     | 4   | 3       |
| owner   | 2    | 5    | 0     | 2     | 6    | 2     | 2   | 6       |
| house   | 1    | 3    | 2     | 0     | 5    | 2     | 3   | 5       |
| park    | 5    | 6    | 6     | 5     | 0    | 1     | 3   | 1       |
| place   | 2    | 2    | 2     | 2     | 1    | 0     | 4   | 4       |
| car     | 1    | 4    | 2     | 3     | 3    | 4     | 0   | 1       |
| weekend | 5    | 3    | 6     | 5     | 1    | 4     | 1   | 0       |

METHOD FOR EXPANDING WORD, WORD EXPANDING APPARATUS, AND NON-TRANSITORY COMPUTER-READABLE RECORDING MEDIUM

BACKGROUND

1. Technical Field

The present disclosure relates to a method for expanding a word, a word expanding apparatus, and a non-transitory computer-readable recording medium.

2. Description of the Related Art

Users are increasingly searching for information regarding products, services, and the like using online search services and the like. In this case, a user needs to input, to an information terminal or the like, a search keyword that represents a product, a service, or the like desired thereby.

Techniques for helping users input search keywords have been proposed. Japanese Patent No. 5809290, for example, discloses a technique for complementing and displaying, on the basis of a dictionary, a search keyword that a user is inputting. In addition, Japanese Patent No. 5557862, for example, discloses a technique for additionally displaying, on the basis of history information regarding search keywords input in the past, candidates for a search keyword likely to be input by a user.

SUMMARY

Since information to be searched has exponentially increased during these years, a large number of search results are output if a user simply inputs a search keyword and performs a search. In a major shopping website, for example, tens of millions of pieces of product information are held. If a user simply inputs a search keyword and performs a search, therefore, tens of thousands of search results can be output. It is therefore difficult for the user to easily access information regarding a product, a service, or the like desired thereby.

One non-limiting and exemplary embodiment provides a method for expanding a word, a word expanding apparatus, and a non-transitory computer-readable recording medium capable of effectively narrowing down search results for each user.

In one general aspect, the techniques disclosed here feature a method for expanding a word performed by a processor. The method includes (a) obtaining a first word, (b) obtaining, from a memory, a concept map that is unique to a user and that includes a plurality of second words and semantic distances between the plurality of second words, the plurality of second words including words belonging to different categories, (c) determining, if the plurality of second words include a word corresponding to the first word, the word corresponding to the first word as a basic word, (d) selecting, on the basis of the semantic distances to the basic word, at least one of the plurality of second words included in the concept map as an adjacent word, and (e) outputting a result of a search on the basis of the first word and the adjacent word.

With the method for expanding a word according to the aspect of the present disclosure, search results can be effectively narrowed down for each user.

It should be noted that this general or specific aspect may be implemented as an apparatus, a system, an integrated circuit, a computer program, a computer-readable recording medium including a non-transitory recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a block diagram illustrating the configuration of a word expanding apparatus according to the first embodiment (third embodiment);

FIG. 4A is a diagram illustrating an example of a concept map of a first user;

FIG. 4B is a diagram illustrating an example of a concept map of a second user;

DETAILED DESCRIPTION

Figure 1A:
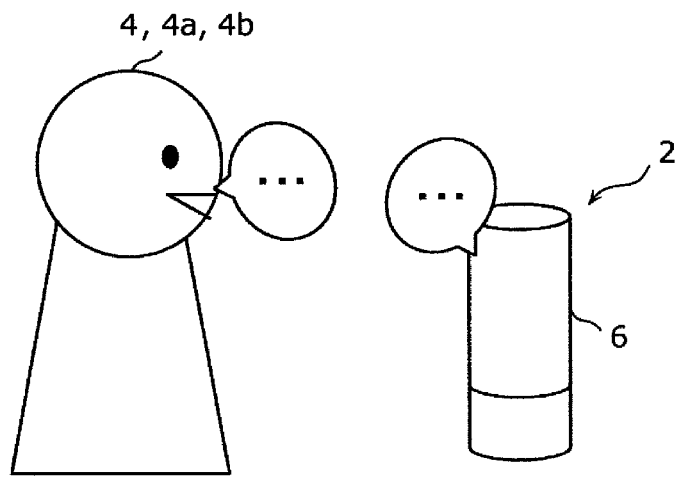
FIG. 1A is a diagram illustrating an example of application of a search system according to a first embodiment.

A method for expanding a word according to an aspect of the present disclosure is a method for expanding a word performed by a processor. The method includes (a) obtaining a first word, (b) obtaining, from a memory, a concept map that is unique to a user and that includes a plurality of second words and semantic distances between the plurality of second words, the plurality of second words including words belonging to different categories, (c) determining, if the plurality of second words include a word corresponding to the first word, the word corresponding to the first word as a basic word, (d) selecting, on the basis of the semantic distances to the basic word, at least one of the plurality of second words included in the concept map as an adjacent word, and (e) outputting a result of a search on the basis of the first word and the adjacent word.

According to this aspect, at least one second word is selected, as an adjacent word, from a plurality of second words included in a concept map unique to a user on the basis of semantic distances to a basic word. As a result, a first word can be expanded using the adjacent word semantically close to the basic word for the user, and a search can be performed. Search results, therefore, can be effectively narrowed down for the user.

For example, in (c), if the plurality of second words do not include a word corresponding to the first word, a paraphrase list including at least one associated word associated with one of the plurality of second words may be referred to, an associated word associated with the first word may be determined, and the second word associated with the determined associated word may be determined as the basic word.

According to this aspect, even if the plurality of second words do not include a word corresponding to the first word, the basic word can be easily determined by determining an associated word while referring to the paraphrase list.

For example, in (c), if there is no associated word associated with the first word in the paraphrase list, a third word may be extracted on the basis of the result of the search performed using the first word, and a second word associated with the third word among the plurality of second words included in the concept map may be determined as the basic word.

According to this aspect, even if there is no associated word in the paraphrase list, the basic word can be easily determined by extracting a third word on the basis of a result of a search based on the first word.

For example, in (d), at least one second word having a semantic distance to the basic word equal to or smaller than a first threshold among the plurality of second words included in the concept map may be selected as the adjacent word.

According to this aspect, at least one second word semantically close to the basic word can be selected as an adjacent word from the plurality of second words included in the concept map.

For example, in (d), if a plurality of second words having semantic distances equal to or smaller than the first threshold are extracted from the concept map, a number of search results, which is a result of a search performed on the basis of the first word and each of the plurality of second words extracted, may be obtained, and a second word having the number of search results equal to or larger than a second threshold among the plurality of second words extracted may be selected as the adjacent word.

According to this aspect, when a search is performed on the basis of the first word and each of the plurality of second words extracted, a second word that yields few search results can be excluded from adjacent words. As a result, search results can be narrowed down more accurately.

For example, the concept map may be generated on the basis of a result of measurement of changes in blood flow of a brain, changes in electric potential, or changes in a magnetic field.

According to this aspect, a concept map can be generated on the basis of a result of measurement of changes in the blood flow of the brain, changes in electric potential, or changes in the magnetic field.

For example, the concept map may be generated on the basis of the result of the measurement of changes in the blood flow of the brain, changes in electric potential, or changes in the magnetic field through functional magnetic resonance imaging.

According to this aspect, a concept map can be generated on the basis of the result of the measurement of changes in the blood flow of the brain, changes in electric potential, or changes in the magnetic field through functional magnetic resonance imaging.

A word expanding apparatus according to an aspect of the present disclosure is a word expanding apparatus including a processor and a memory. The processor (a) obtains a first word, (b) obtaining, from a memory, a concept map that is unique to a user and that includes a plurality of second words and semantic distances between the plurality of second words, the plurality of second words including words belonging to different categories, (c) determining, if the plurality of second words include a word corresponding to the first word, the word corresponding to the first word as a basic word, (d) selecting, on the basis of the semantic distances to the basic word, at least one of the plurality of second words included in the concept map as an adjacent word, and (e) outputting words for a search on the basis of the first word and the adjacent word.

According to this aspect, at least one second word is selected, as an adjacent word, from a plurality of second words included in a concept map unique to a user on the basis of semantic distances to a basic word. As a result, a first word can be expanded using the adjacent word semantically close to the basic word for the user, and a search can be performed. Search results, therefore, can be effectively narrowed down for the user.

For example, in (c), if the plurality of second words do not include a word corresponding to the first word, a paraphrase list including at least one associated word associated with one of the plurality of second words may be referred to, an associated word associated with the first word may be determined, and the second word associated with the determined associated word may be determined as the basic word.

According to this aspect, even if the plurality of second words do not include a word corresponding to the first word, the basic word can be easily determined by determining an associated word while referring to the paraphrase list.

For example, in (c), if there is no associated word associated with the first word in the paraphrase list, a third word may be extracted on the basis of the result of the search performed using the first word, and a second word associated with the third word among the plurality of second words included in the concept map may be determined as the basic word.

According to this aspect, even if there is no associated word in the paraphrase list, the basic word can be easily determined by extracting a third word on the basis of a result of a search based on the first word.

For example, in (d), at least one second word having a semantic distance to the basic word equal to or smaller than a first threshold among the plurality of second words included in the concept map may be selected as the adjacent word.

According to this aspect, at least one second word semantically close to the basic word can be selected as an adjacent word from the plurality of second words included in the concept map.

For example, in (d), if a plurality of second words having semantic distances equal to or smaller than the first threshold are extracted from the concept map, a number of search results, which is a result of a search performed on the basis of the first word and each of the plurality of second words extracted, may be obtained, and a second word having the number of search results equal to or larger than a second threshold among the plurality of second words extracted may be selected as the adjacent word.

According to this aspect, when a search is performed on the basis of the first word and each of the plurality of second words extracted, a second word that yields few search results can be excluded from adjacent words. As a result, search results can be narrowed down more accurately.

For example, the concept map may be generated on the basis of a result of measurement of changes in blood flow of a brain, changes in electric potential, or changes in a magnetic field.

According to this aspect, a concept map can be generated on the basis of a result of measurement of changes in the blood flow of the brain, changes in electric potential, or changes in the magnetic field.

For example, the concept map may be generated on the basis of the result of the measurement of changes in the blood flow of the brain, changes in electric potential, or changes in the magnetic field through functional magnetic resonance imaging.

According to this aspect, a concept map can be generated on the basis of the result of the measurement of changes in the blood flow of the brain, changes in electric potential, or changes in the magnetic field through functional magnetic resonance imaging.

A non-transitory computer-readable recording medium according to an aspect of the present disclosure is a non-transitory computer-readable recording medium storing a control program for causing a device including a processor to perform operations including (a) obtaining a first word, (b) obtaining, from a memory, a concept map that is unique to a user and that includes a plurality of second words and semantic distances between the plurality of second words, the plurality of second words including words belonging to different categories, (c) determining, if the plurality of second words include a word corresponding to the first word, the word corresponding to the first word as a basic word, (d) selecting, on the basis of the semantic distances to the basic word, at least one of the plurality of second words included in the concept map as an adjacent word, and (e) outputting a result of a search on the basis of the first word and the adjacent word.

According to this aspect, at least one second word is selected, as an adjacent word, from a plurality of second words included in a concept map unique to a user on the basis of semantic distances to a basic word. As a result, a first word can be expanded using the adjacent word semantically close to the basic word for the user, and a search can be performed. Search results, therefore, can be effectively narrowed down for the user.

It should be noted that these general or specific aspects may be implemented as a system, a method, an integrated circuit, a computer program, a computer-readable recording medium such as a CD-ROM, or any selective combination thereof.

Embodiments will be specifically described with reference to the drawings.

The following embodiments are general or specific examples. Values, shapes, materials, components, arrangement positions and connection modes of the components, steps, the order of the steps, and the like mentioned in the following embodiments are examples, and do not limit the present disclosure. Among the components described in the following embodiments, ones not described in the independent claims, which define broadest concepts, will be described as arbitrary components.

First Embodiment 1-1. Outline of Search System

Figure 1B:
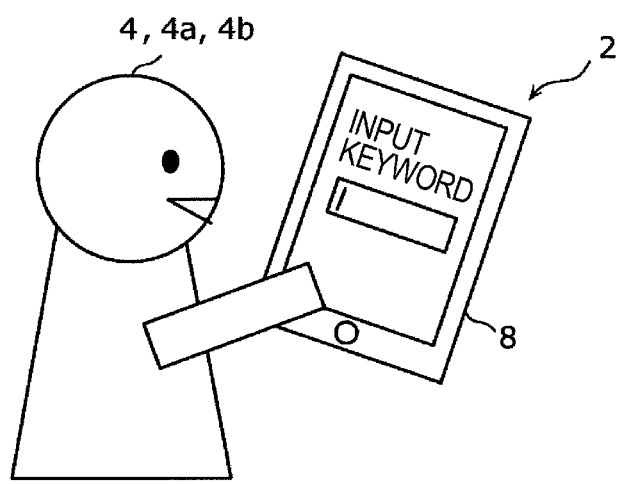
FIG. 1B is a diagram illustrating another example of the application of the search system according to the first embodiment.
Figure 2:
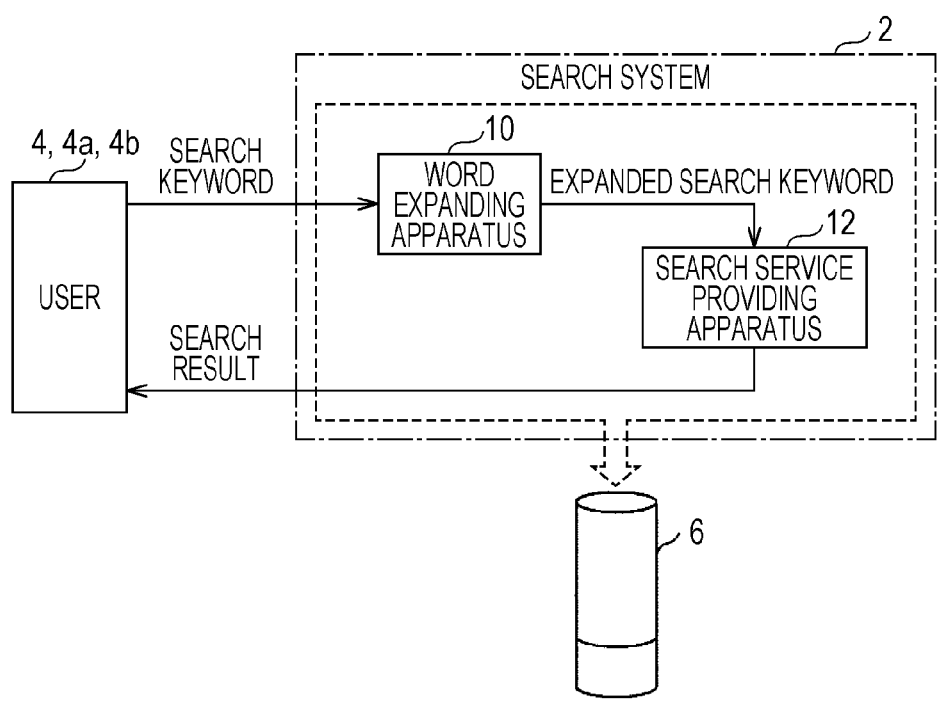
FIG. 2 is a block diagram illustrating the configuration of the search system according to the first embodiment.

First, an outline of a search system 2 according to a first embodiment will be described with reference to FIGS. 1A to 2. FIG. 1A is a diagram illustrating an example of application of the search system 2 according to the first embodiment. FIG. 1B is a diagram illustrating another example of the application of the search system 2 according to the first embodiment. FIG. 2 is a block diagram illustrating the configuration of the search system 2 according to the first embodiment.

The search system 2 according to the first embodiment is a system for performing a search using an online search service and outputting search results, for example, after a user 4 inputs a search keyword.

In the example illustrated in FIG. 1A, the search system 2 includes an audio terminal 6 including an audio interface. The user 4 inputs a search keyword to the audio terminal 6 by speaking to the audio terminal 6. As a result, the audio terminal 6 outputs search results as sound. More specifically, if the user 4 inputs a search keyword for requesting weather of the day, recommended music, or the like to the audio terminal 6, the audio terminal 6 provides an appropriate service corresponding to the search keyword as sound.

In the example illustrated in FIG. 1B, the search system 2 includes an information terminal 8 including a touch panel, such as a tablet or a smartphone. The user 4 inputs a search keyword by operating the touch panel of the information terminal 8. As a result, the information terminal 8 displays search results on the touch panel.

As illustrated in FIG. 2, the search system 2 includes a word expanding apparatus 10 and a search service providing apparatus 12. The word expanding apparatus 10 receives a search keyword input by the user 4. Furthermore, the word expanding apparatus 10 adds, to the received search keyword, adjacent keywords, which are semantically close to the search keyword for the user 4, and outputs words for a search, which are a combination of the search keyword and the adjacent keywords, as expanded search keywords. The search service providing apparatus 12 performs a search using an online search service, for example, on the basis of the expanded search keywords output from the word expanding apparatus 10 and outputs search results to the user 4. For example, the word expanding apparatus 10 and the search service providing apparatus 12 are both mounted on the audio terminal 6.

1-2. Configuration of Word Expanding Apparatus

Next, the configuration of the word expanding apparatus 10 according to the first embodiment will be described with reference to FIG. 3. FIG. 3 is a block diagram illustrating the configuration of the word expanding apparatus 10 according to the first embodiment.

As illustrated in FIG. 3, the word expanding apparatus 10 includes a reception unit 14, a basic word extraction unit 16, a concept map accumulation unit 18, an adjacent word extraction unit 20, a conversion unit 22, and an output unit 24.

The reception unit 14 receives a search keyword input by the user 4 as a first word. A "word" herein can refer not only to a word that is a minimum unit of a sentence but also to a combination of two or more words.

The basic word extraction unit 16 determines a basic word indicating a basic concept of the first word on the basis of the first word received by the reception unit 14.

The concept map accumulation unit 18 is a memory accumulating concept maps unique to users 4. A concept map is data regarding semantic distances between a plurality of second words and generated in advance for each user 4. Concept maps will be described in detail later.

The adjacent word extraction unit 20 extracts at least one adjacent word indicating an adjacent concept semantically close to the basic concept of the basic word on the basis of the concept maps accumulated in the concept map accumulation unit 18.

The conversion unit 22 converts the adjacent word extracted by the adjacent word extraction unit 20 into a format suitable for a search and outputs the adjacent word as an adjacent keyword.

The output unit 24 outputs words for a search, which are a combination of the search keyword (first word) received by the reception unit 14 and the adjacent keyword obtained as a result of the conversion performed by the conversion unit 22, to the search service providing apparatus 12 (refer to FIG. 2) as expanded search keywords.

1-3. Configuration of Concept Maps

Next, the configuration of concept maps will be described with reference to FIGS. 4A and 4B. FIG. 4A is a diagram illustrating an example of a concept map of a first user 4a. FIG. 4B is a diagram illustrating an example of a concept map of a second user 4b.

Concept maps are each associated with a certain user 4 and represented, for example, as two-dimensional tables illustrated in FIGS. 4A and 4B. The concept map illustrated in FIG. 4A is an example of the concept map associated with the first user 4a, and the concept map illustrated in FIG. 4B is an example of the concept map associated with the second user 4b different from the first user 4a.

As illustrated in FIGS. 4A and 4B, the concept maps each include a plurality of second words and semantic distances between the plurality of second words.

The concept maps each include, say, 1,000 second words. In this case, the concept maps are two-dimensional tables having a size of 1,000×1,000. The second words are English words indicating concepts used in daily life, such as "home", "rent", "owner", and "house". In FIGS. 4A and 4B, the concept maps are represented as 8×8 two-dimensional tables including eight second words for convenience of description.

The semantic distances are relative values indicating semantic closeness between the second words. In the examples illustrated in FIGS. 4A and 4B, the semantic distances are integers of 0 to 10. Smaller semantic distances indicate that second words are semantically closer to each other. More specifically, when the semantic distance is 1, two different second words are semantically closest to each other, and when the semantic distance is 10, two different second words are semantically farthest from each other. Semantic distances between the same general words, such as "home" and "home", are 0.

A semantic distance of the first user 4a between a first word and a second word may be information indicating how easily the first user 4a associates the first word and the second word with each other.

In the example illustrated in FIG. 4A, semantic distances to "home" are 1 in the case of "house", "car", and "weekend", 2 in the case of "rent" and "place", 4 in the case of "owner", and 5 in the case of "park". In the example illustrated in FIG. 4B, semantic distances to "home" are 1 in the case of "house" and "car", 2 in the case of "owner" and "place", 3 in the case of "rent", and 5 in the case of "park" and "weekend". For the first user 4a, "home" and "weekend", for example, are semantically close concepts, which can indicate that the first user 4a usually spend his/her weekends at home. For the second user 4b, on the other hand, "home" and "weekend", for example, are semantically far concepts, which can indicate that the second user 4b usually goes out on weekends. That is, differences between the semantic distances of the concept map illustrated in FIG. 4A and the semantic distances of the concept map illustrated in FIG. 4B indicate individual differences between the first user 4a and the second user 4b in terms of concepts.

Semantic distances herein will be described in more detail. In FIG. 4A, a semantic distance of "house" to "home", for example, is 1. Semantic distances of "car" and "weekend" to "home" are also 1. In general terms, the semantic distance of "house" to "home" is different from the semantic distance of "car" or "weekend" to "home". In the concept map according to the first user 4a, however, the semantic distance of "house" to "home" is the same as the semantic distance of "car" or "weekend" to "home". In other words, the first user 4a associates "house", "car", and "weekend" with the word "home" in equal closeness.

Here, the second words included in the concept maps include words belonging to different categories. In other words, the second words include words other than synonyms. This is because the concept maps include semantic distances between words other than synonyms in general terms. Furthermore, in the concept maps, a semantic distance between a plurality of words in different categories might be smaller than a semantic distance between a plurality of words in the same category. An example of categories is as follows. A category indicating geography includes words such as "woods", "meadow", "canyon", and "river". A category indicating wild animals includes words such as "possum", "elephant", "wolf", "turtle", and "butterfly". A category indicating foods includes words such as "rice" "bacon", and "bread". A category indicating music includes words such as "singer", "violin", "onstage", and "release". A category indicating numbers includes words such as "16" and "23". A category indicating clothing includes words such as "blouse" and "hat". A category indicating personal appearance includes words such as "beauty" and "spectacles". Categories may be defined in accordance with parts of speech (include nouns, verbs, and adjectives) of words.

The concept maps are generated, for example, on the basis of results of measurement of changes in blood flow, electric potential, or a magnetic field caused by changes in brain activity. More specifically, brain reactions of the users 4 are measured through functional magnetic resonance imaging (fMRI) while the users 4 are listening to a plurality of stories. The stories include about 1,000 English words. Relationships between the English words are visually mapped on the cerebral cortex on the basis of results of the measurement of the brain reactions. Semantic distances between the 1,000 English words can be defined, for example, using a method described in the following example of the related art. That is, concept maps including semantic distances between a plurality of English words can be generated. Semantic distances within a range of 0.0 to 1.0 can be defined, for example, by normalizing physical distances between the English words on the cerebral cortex.

For the measurement of changes in the blood flow in the brain, a known method disclosed in Alexander G. Huth, Wendy A. de Heer, Thomas L. Griffiths, Frederic E. Theunissen, and Jack L. Gallant, "Natural speech reveals the semantic maps that tile human cerebral cortex", Nature, Vol. 532, p. 453-458, Apr. 28, 2016, Nature Publishing Group, for example, may be used.

Concept maps may be generated using another method, instead, insofar as semantic distances between a plurality of concepts are defined. Concept maps may be generated, for example, by estimating semantic distances between a plurality of concepts on the basis of speech and behavior of the users 4 in their daily lives.

1-4. Operation of Word Expanding Apparatus

Figure 5:
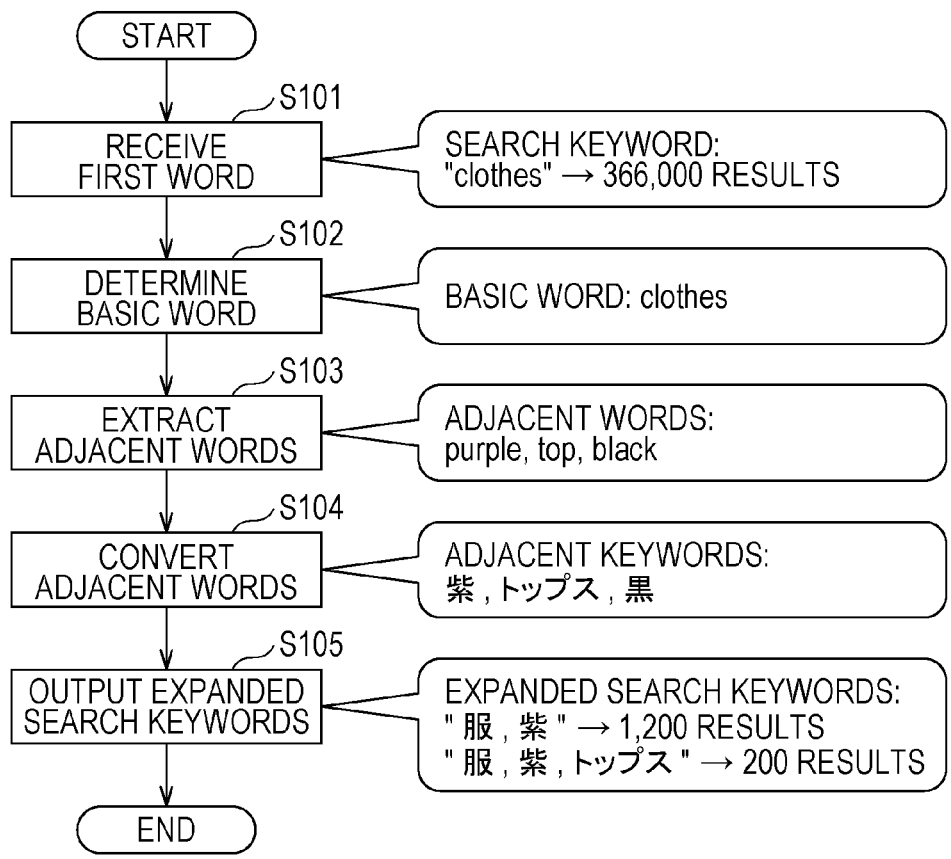
FIG. 5 is a flowchart illustrating an operation procedure of the word expanding apparatus according to the first embodiment.
Figure 6:
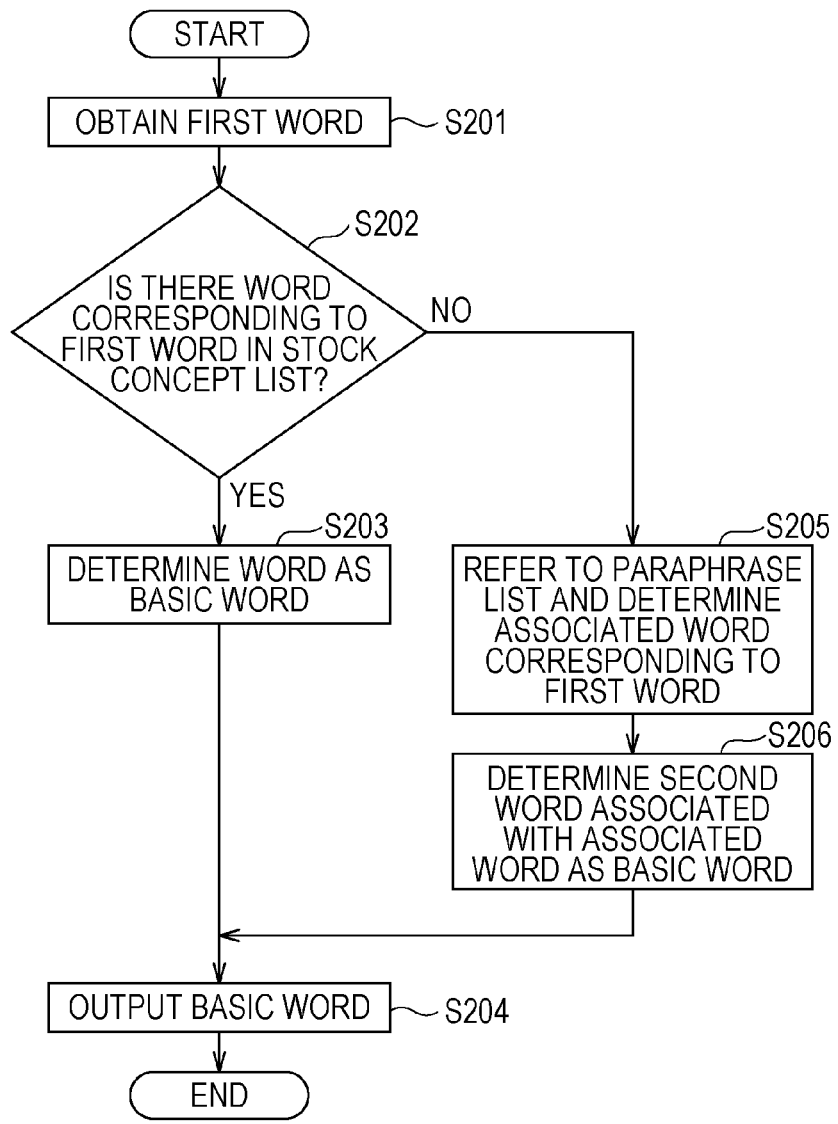
FIG. 6 is a flowchart specifically illustrating processing in step S102 illustrated in FIG. 5.
Figure 7:
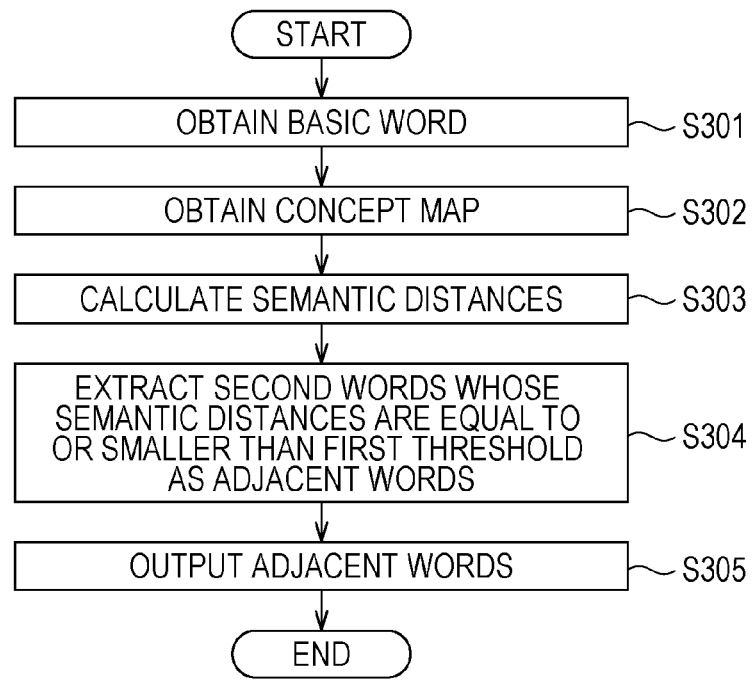
FIG. 7 is a flowchart specifically illustrating processing in step S103 illustrated in FIG. 5.

Next, the operation of the word expanding apparatus 10 according to the first embodiment will be described with reference to FIGS. 5 to 7. FIG. 5 is a flowchart illustrating an operation procedure of the word expanding apparatus 10 according to the first embodiment. FIG. 6 is a flowchart specifically illustrating processing in step S102 illustrated in FIG. 5. FIG. 7 is a flowchart specifically illustrating processing in step S103 illustrated in FIG. 5.

A case will be described hereinafter in which a user 4 accesses a shopping website using the information terminal 8 (refer to FIG. 1B) in order to purchase clothes for his/her child's kindergarten graduation ceremony.

As illustrated in FIG. 5, the reception unit 14 of the word expanding apparatus 10 receives a search keyword input by the user 4 as a first word (S101). If the user 4 inputs "clothes" as a search keyword, for example, the reception unit 14 receives the search keyword "clothes" as the first word.

It is assumed that the user 4 narrows down search results with a search condition "women's clothing" in a shopping website and finds as many as about 366,000 search results for the search keyword "clothes" and about 9,400 search results for search keywords "kindergarten graduation ceremony, clothing". In this case, it is difficult for the user 4 to check all the search results and find suitable clothes. In the present embodiment, the following steps S102 to S105 are performed to expand the search keyword input by the user 4 so that search results desirable to the user 4 are output.

Next, the basic word extraction unit 16 of the word expanding apparatus 10 determines a basic word indicating a basic concept of the first word on the basis of the first word received by the reception unit 14 (S102).

The processing in step S102 illustrated in FIG. 5 will be described hereinafter with reference to FIG. 6. As illustrated in FIG. 6, first, the basic word extraction unit 16 obtains the first word received by the reception unit 14 (S201). Next, the basic word extraction unit 16 refers to a stock concept list and determines whether there is a word corresponding to the first word in the stock concept list (S202). The stock concept list is a list of a plurality of second words included in concept maps accumulated in the concept map accumulation unit 18 and held by the basic word extraction unit 16. The stock concept list includes, say, about 1,000 second words.

If a language of the first word is different from a language of the second words, the word corresponding to the first word may be a word obtained by translating the first word into a second language. If the first word is Japanese and the second words are English, for example, the word corresponding to the first word may be a word obtained by translating the first word into English.

If the first word and the second words are the same language, on the other hand, the word corresponding to the first word may be the first word itself. If the first word and the second words are Japanese, for example, the word corresponding to the first word may be the first word itself.

If the first word receives by the reception unit 14 is "clothes" and there is the word "clothes" corresponding to the first word "clothes" in the stock concept list (YES in S202), the basic word extraction unit 16 determines the word "clothes" as the basic word (S203). The basic word extraction unit 16 then outputs the basic word "clothes" to the adjacent word extraction unit 20 (S204).

In step S202, if the first word received by the reception unit 14 is "kimono" and there is no word corresponding to the first word "kimono" in the stock concept list (NO in S202), for example, the basic word extraction unit 16 refers to a paraphrase list. The paraphrase list is a list in which each of the second words included in the stock concept list is associated with at least one associated word, which is a paraphrase of the second word, and held by the basic word extraction unit 16. The paraphrase list includes, for example, "kimono" as an associated word of the second word "clothes".

The basic word extraction unit 16 refers to the paraphrase list and determines the associated word "kimono" corresponding to the first word "kimono" (S205) and determines the second word "clothes" associated with the associated word "kimono" as the basic word (S206). The basic word extraction unit 16 then outputs the basic word "clothes" to the adjacent word extraction unit 20 (S204).

The associated words included in the paraphrase list can be set using one of various methods. Synonyms of the second words may be set as associated words while, for example, referring to a known thesaurus. Alternatively, the user 4 may set associated words by operating the information terminal 8 or the like. Alternatively, associated words may be set by obtaining words from audio data regarding speech of the user 4 in daily life and associating the obtained words with the second words.

In FIG. 5, after step S102, the adjacent word extraction unit 20 of the word expanding apparatus 10 extracts, on the basis of the concept maps accumulated in the concept map accumulation unit 18, at least one adjacent word, which indicates an adjacent concept semantically close to the basic concept of the basic word (S103).

The processing in step S103 illustrated in FIG. 5 will be specifically described hereinafter with reference to FIG. 7. As illustrated in FIG. 7, first, the adjacent word extraction unit 20 obtains the basic word output from the basic word extraction unit 16 (S301). The adjacent word extraction unit 20 obtains, for example, the basic word "clothes".

Next, the adjacent word extraction unit 20 obtains, among the concept maps accumulated in the concept map accumulation unit 18, a concept map associated with the user 4 who has input the first word "clothes" (S302).

Next, the adjacent word extraction unit 20 calculates semantic distances between the basic word "clothes" obtained in step S301 and the second words (other than the basic word) included in the concept map obtained in step S302 (S303). More specifically, the adjacent word extraction unit 20 sequentially extracts the semantic distances included in the concept maps illustrated in FIG. 4A or FIG. 4B. If the concept maps each include 1,000 second words, for example, there are 999 second words other than a basic word for the basic word. The adjacent word extraction unit 20, therefore, sequentially extracts 999 semantic distances.

Next, the adjacent word extraction unit 20 selects and extracts, on the basis of the semantic distances calculated in step S303, second words whose semantic distances to the basic word "clothes" are equal to or smaller than a first threshold (e.g., 2), namely, for example, "purple", "top", and "black", from the concept map as adjacent words (S304).

The adjacent words "purple", "top", and "black" are words semantically close to the basic word "clothes" for the user 4. That is, it can be estimated that the user 4 likes purple clothes, black clothes, and tops. In the above-described example of the measurement of changes in the blood flow in the brain, words such as "purple", "top", and "black" are mapped on the cerebral cortex near "clothes". The adjacent word extraction unit 20 then outputs the extracted adjacent words "purple", "top", and "black" to the conversion unit 22 (S305).

Several second words, for example, are extracted in step S304. The number of second words to be extracted may be changed in accordance with the number of products or pieces of information provided by a search service. For example, as the number of products or pieces of information provided by a search service increases, the number of second words to be extracted increases.

In FIG. 5, after step S103, the conversion unit 22 of the word expanding apparatus 10 converts the adjacent word extracted by the adjacent word extraction unit 20 into a format suitable for a search (S104) and outputs the adjacent word to the output unit 24 as an adjacent keyword. If a search service is displayed in Japanese, for example, the conversion unit 22 converts the adjacent word from English into Japanese. In this example, "conversion" refers to translation of an adjacent word from English to Japanese. More specifically, the conversion unit 22 converts the adjacent words "purple", "top", and "black" into corresponding Japanese words and outputs the Japanese words as adjacent keywords.

Next, the output unit 24 of the word expanding apparatus 10 outputs, to the search service providing apparatus 12, words for a search, which are a combination of the search keyword "clothes" received by the reception unit 14 and the Japanese adjacent keywords "purple", "top", and "black" obtained as a result of the conversion performed by the conversion unit 22, as expanded search keywords (S105). The output unit 24 outputs, for example, at least one of "clothes, purple", "clothes, purple, top", "clothes, black", and "clothes, black, top" as expanded search keywords.

The search service providing apparatus 12 performs a search on the basis of the expanded search keywords output from the output unit 24 using, for example, an online search service and outputs search results to the user 4. For example, about 1,200 search results are output for the expanded search keywords "clothes, purple", and about 200 search results are output for the expanded search keywords "clothes, purple, top". That is, the number of search results can be reduced to one-tenths to one-hundredths compared to when a search is performed using only "clothes" as a search keyword.

Alternatively, the processing in steps S102 to S105 may be performed only when the number of search results based on a search keyword received by the reception unit 14 exceeds a threshold (e.g., 1,000).

1-5. Advantageous Effects

Figure 8:
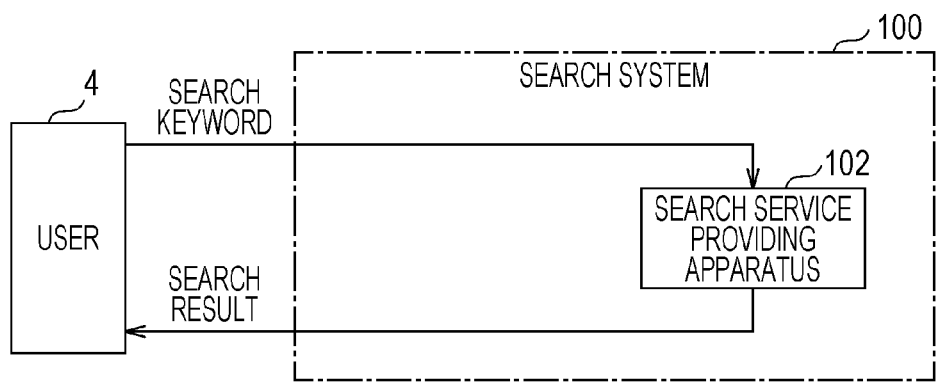
FIG. 8 is a block diagram illustrating the configuration of a conventional search system.

FIG. 8 is a block diagram illustrating the configuration of a conventional search system 100. As illustrated in FIG. 8, the conversional search system 100 includes only a search service providing apparatus 102. The search service providing apparatus 102 receives a search keyword input by the user 4, performs a search only on the basis of the received search keyword using, for example, an online search service, and outputs search results to the user 4. If the user 4 inputs "clothes" as a search keyword, for example, the search service providing apparatus 102 performs a search using the search keyword "clothes".

As described above, however, if a search is performed using only a search keyword input by the user 4, a large number of search results are output. It is therefore difficult for the user 4 to check all the search results and find a suitable piece of information.

In the present embodiment, on the other hand, an adjacent keyword semantically close to a search keyword for the user 4 is added to the search keyword on the basis of a concept map unique to the user 4, and words for a search, which are a combination of the search keyword and the adjacent keyword, are output as expanded search keywords.

As a result, if a search keyword input by the user 4 is "clothes", for example, the search keyword can be expanded using "purple", "top", and "black", which are semantically close to "clothes" for the user 4 and can indicate tastes of the user 4, as adjacent keywords. As a result, search results can be effectively narrowed down for the user 4, and search results desirable for the user 4 can be output.

Second Embodiment

Figure 9:
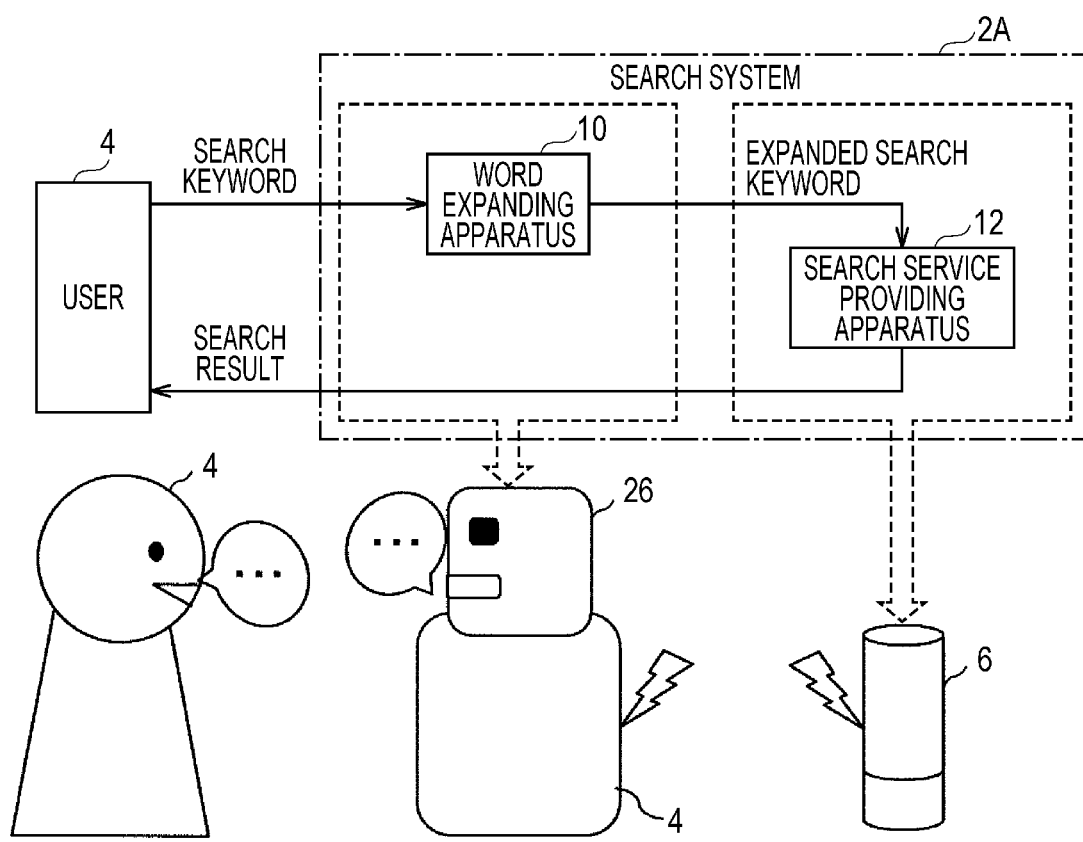
FIG. 9 is a block diagram illustrating the configuration of a search system according to a second embodiment.

An outline of a search system 2A according to a second embodiment will be described with reference to FIG. 9. FIG. 9 is a block diagram illustrating the configuration of the search system 2A according to the second embodiment. In the following embodiments, the same components as those according to the first embodiment are given the same reference numerals, and description thereof is omitted.

As illustrated in FIG. 9, in the search system 2A according to the second embodiment, the word expanding apparatus 10 and the search service providing apparatus 12 are mounted on different devices. More specifically, the word expanding apparatus 10 is mounted on an agent robot 26, and the search service providing apparatus 12 is mounted on the audio terminal 6. The agent robot 26 includes an audio interface. The agent robot 26 and the agent robot 6 can wirelessly communicate data with each other.

The user 4 speaks to the agent robot 26 to input a search keyword to the word expanding apparatus 10 mounted on the agent robot 26. The word expanding apparatus 10 then outputs expanded search keywords to the search service providing apparatus 12 mounted on the agent robot 6. The search service providing apparatus 12 performs a search on the basis of the expanded search keywords output from the word expanding apparatus 10 and outputs search results to the agent robot 26. The agent robot 26 then outputs the search results as sound.

In the present embodiment, the word expanding apparatus 10 and the search service providing apparatus 12 are mounted on separate devices, and the word expanding apparatus 10 can be used with any type of search service providing apparatus 12. As a result, the versatility of the word expanding apparatus 10 improves.

Third Embodiment

Figure 10:
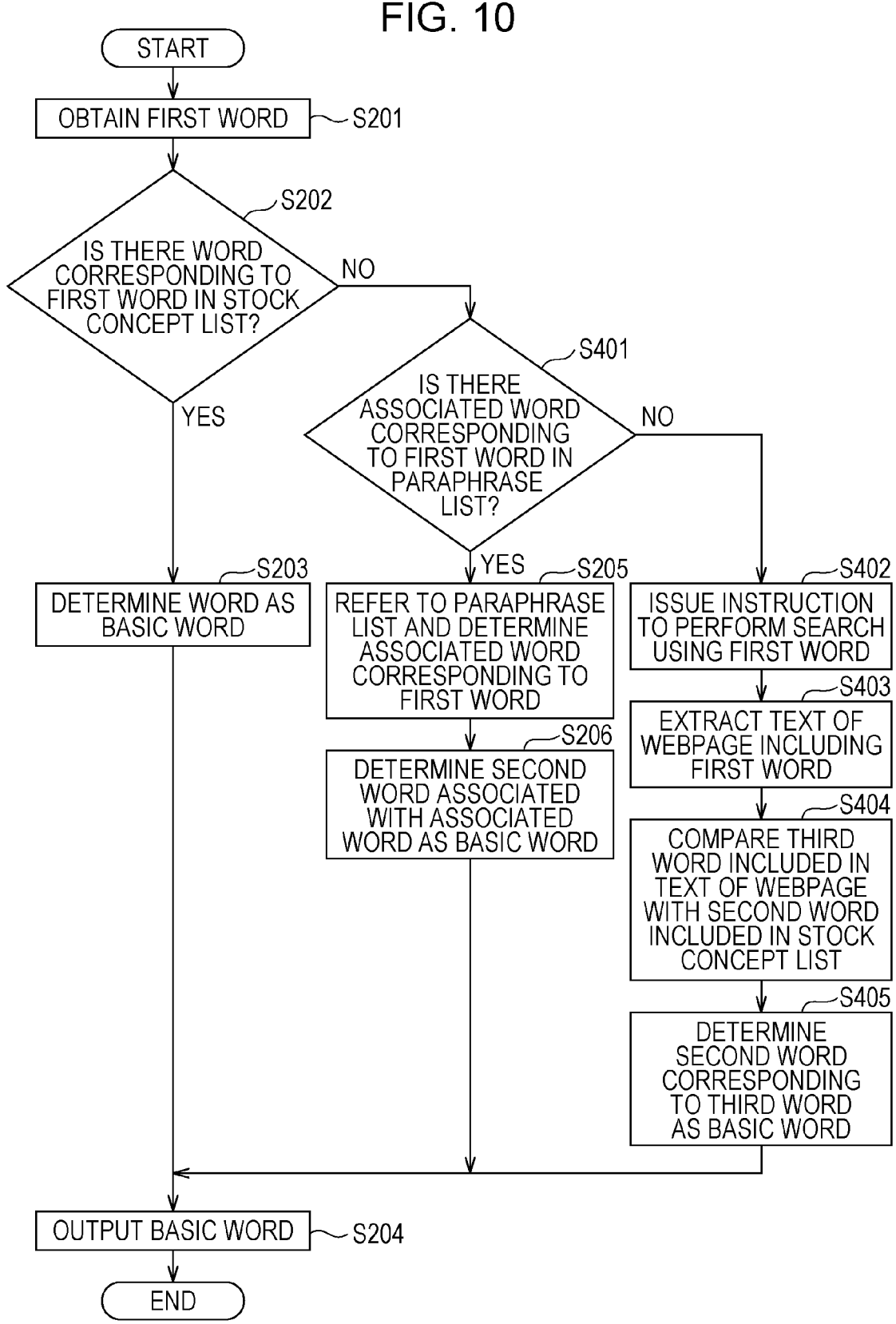
FIG. 10 is a flowchart illustrating an operation procedure of a word expanding apparatus according to a third embodiment.

The operation of a word expanding apparatus 10B (refer to FIG. 3) according to a third embodiment will be described with reference to FIG. 10. FIG. 10 is a flowchart illustrating an operation procedure of the word expanding apparatus 10B according to the third embodiment. In the flowchart illustrated in FIG. 10, the same steps as those of the flowchart of FIG. 6 are given the same reference numerals, and description thereof is omitted.

In the word expanding apparatus 10B according to the third embodiment, processing in step S102 illustrated in FIG. 5 is different from that in the first embodiment. More specifically, in step S202 illustrated in FIG. 10, if determining that there is no word corresponding to the first word in the stock concept list (NO in S202), a basic word extraction unit 16B (refer to FIG. 3) determines whether there is a word corresponding to the first word in the paraphrase list (S401). If the basic word extraction unit 16B determines that there is a word corresponding to the first word in the paraphrase list (YES in S401), the operation proceeds to step S205.

If the first word is "special XX" and the basic word extraction unit 16B determines that there is no word corresponding to the first word "special XX" in the paraphrase list (NO in S401), on the other hand, the basic word extraction unit 16B instructs the search service providing apparatus 12 (refer to FIG. 2) to perform a search using the first word "special XX" (S402). There is no word corresponding to the first word in the paraphrase list when, for example, the first word is a new proper noun, such as a name of a new product.

The search service providing apparatus 12 performs a search using an online search service on the basis of the first word "special XX" as a search keyword. The basic word extraction unit 16B obtains search results from the search service providing apparatus 12 and extracts a text of a webpage including the first word "special XX" (S403).

Next, the basic word extraction unit 16B compares a third word included in the extracted text of the webpage with the second words included in the stock concept list (S404). If the webpage includes a text, "Here is the special XX, a type of clothes currently popular among women", the basic word extraction unit 16B compares a third word "clothes" included in the text with the second words included in the stock concept list. If the stock concept list includes a second word "clothes" corresponding to the third word "clothes" as a result of the comparison, the basic word extraction unit 16B determines the second word "clothes" as a basic word (S405). The basic word extraction unit 16B then outputs the basic word "clothes" to the adjacent word extraction unit 20 (S204).

As described above, in the present embodiment, even if the user 4 (refer to FIG. 2) inputs a new proper noun as a search keyword, for example, a basic word can be determined on the basis of the search keyword. As a result, a search can be performed using search keywords including the new proper noun without regularly updating the paraphrase list.

Fourth Embodiment 4-1. Configuration of Word Expanding Apparatus

Figure 11:
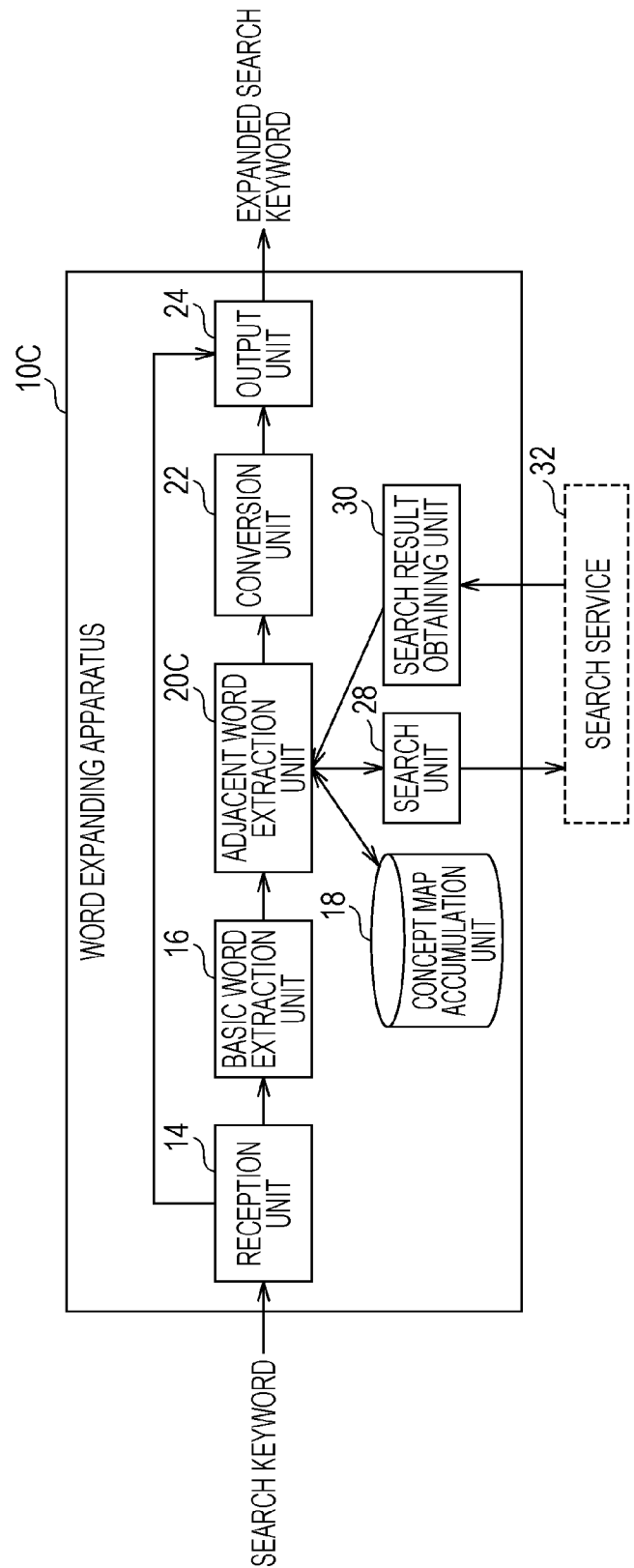
FIG. 11 is a block diagram illustrating the configuration of a word expanding apparatus according to a fourth embodiment.

The configuration of a word expanding apparatus 10C according to a fourth embodiment will be described with reference to FIG. 11. FIG. 11 is a block diagram illustrating the configuration of the word expanding apparatus 10C according to the fourth embodiment.

As illustrated in FIG. 11, the word expanding apparatus 10C includes a search unit 28 and a search result obtaining unit 30 in addition to the components described in the first embodiment.

The search word reception section 28 adds an adjacent word extracted by an adjacent word extraction unit 20C to a first word input by the user 4 (refer to FIG. 2) and performs a search using an external search service 32 on the basis of a combination of the first word and the adjacent word as temporary expanded search keywords. The external search service 32 may be the same search service as that used by the search service providing apparatus 12 (refer to FIG. 2) for a search.

The search result obtaining unit 30 obtains the number of search results, which is a result of a search performed by the search unit 28, from the external search service 32. Search results obtained by the search unit 28, that is, for example, a product list, descriptions, and the like, may be added to the number of search results obtained by the search result obtaining unit 30.

4-2. Operation of Word Expanding Apparatus

Figure 12:
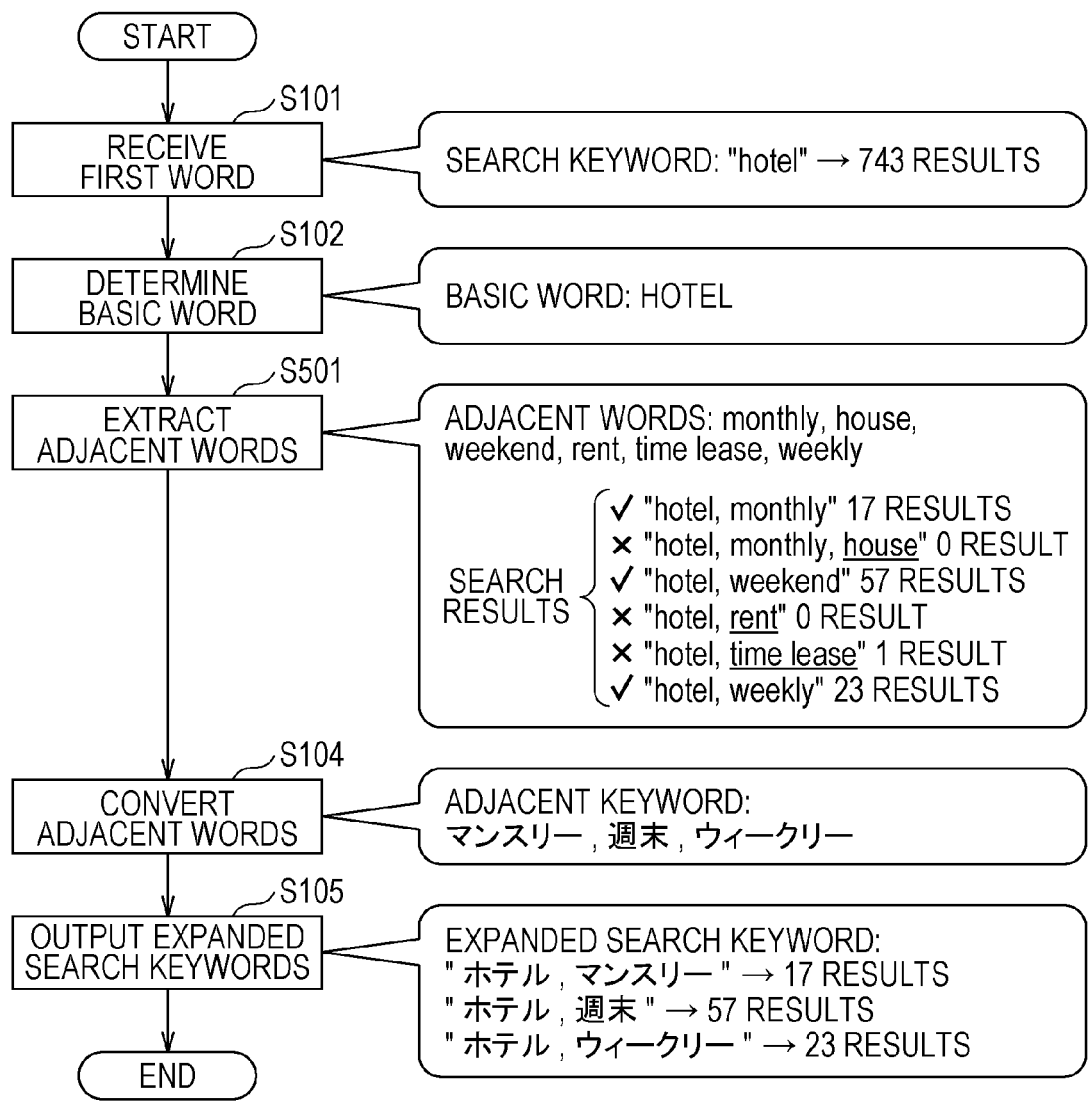
FIG. 12 is a flowchart illustrating an operation procedure of the word expanding apparatus according to the fourth embodiment.
Figure 13:
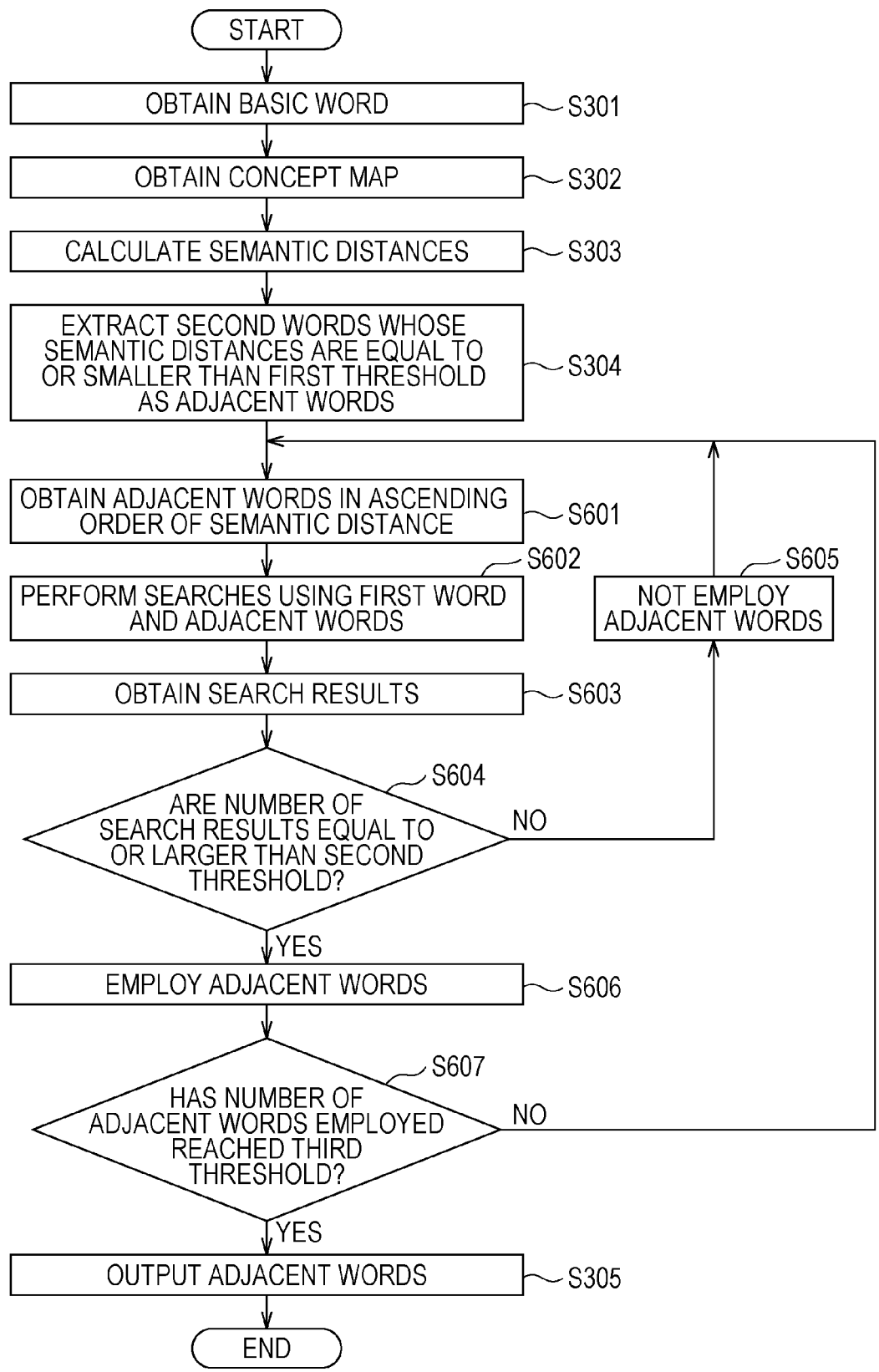
FIG. 13 is a flowchart specifically illustrating processing in step S501 illustrated in FIG. 12.

Next, the operation of the word expanding apparatus 10C according to the fourth embodiment will be described with reference to FIGS. 12 and 13. FIG. 12 is a flowchart illustrating an operation procedure of the word expanding apparatus 10C according to the fourth embodiment. FIG. 13 is a flowchart specifically illustrating processing in step S501 illustrated in FIG. 12. In the flowchart illustrated in FIG. 12, the same steps as those of the flowchart of FIG. 5 are given the same reference numerals, and description thereof is omitted. In the flowchart illustrated in FIG. 13, the same steps as those of the flowchart of FIG. 7 are given the same reference numerals, and description thereof is omitted.

It is assumed hereinafter, for example, that the user 4 accesses a reservation website in order to find a hotel in a tourist resort.

As illustrated in FIG. 12, the reception unit 14 of the word expanding apparatus 10C receives a search keyword "hotel" input by the user 4 as a first word (S101). If a search is performed in a reservation website using only the search keyword "hotel", as many as 743 search results are output.

Next, the basic word extraction unit 16 of the word expanding apparatus 10C determines a basic word "hotel" indicating a basic concept of the first word "hotel" on the basis of the first word "hotel" received from the reception unit 14 (S102). It is assumed in the present embodiment that the second words included in the stock concept list and the concept list are Japanese.

Next, the adjacent word extraction unit 20C of the word expanding apparatus 10C extracts at least one adjacent word indicating an adjacent concept semantically close to the basic concept of the basic word "hotel" on the basis of the concept maps accumulated in the concept map accumulation unit 18 (S501).

The processing in step S501 illustrated in FIG. 12 will be specifically described with reference to FIG. 13. As illustrated in FIG. 13, first, steps S301 to S405 are performed as in the first embodiment. The adjacent word extraction unit 20C selects and extracts, on the basis of the semantic distances calculated in step S303, second words whose semantic distances to the basic word "hotel" are equal to or smaller than the first threshold (e.g., 2), namely, for example, "monthly", "house", "weekend", "rent", "time lease", and "weekly", from the concept map as adjacent words (S304).

Next, the adjacent word extraction unit 20C obtains the adjacent words extracted in step S304 one by one in descending order of the semantic distance to the basic word "hotel" (S601). The search unit 28 adds the adjacent words obtained by the adjacent word extraction unit 20C to the first word "hotel" input by the user 4 and performs a search using the external search service 32 on the basis of a combination of the first word "hotel" and the adjacent word as temporary expanded search keywords (S602). The search result obtaining unit 30 obtains the number of search results, which is a result of the search performed by the search unit 28, from the external search service 32 (S603).

If the number of search results obtained by the search result obtaining unit 30 is smaller than the second threshold (e.g., 10) (NO in S604), the adjacent word extraction unit 20C does not employ (select) the adjacent words obtained in step S601 (S605). The number of search results for the temporary expanded search keywords "hotel, monthly, house", "hotel, rent", and "hotel, time lease", for example, is zero, zero, and one, respectively, and "house", "rent", and "time lease" are not employed as adjacent words. Although the adjacent words "house", "rent", and "time lease" are semantically close to the basic word "hotel" for the user 4, they are not suitable as expanded search keywords. In this case, steps S601 to S604 are performed again.

If the number of search results obtained by the search result obtaining unit 30 is equal to or larger than the second threshold (YES in S604), the adjacent word extraction unit 20C employs the adjacent words obtained in step S601 (S606). The number of search results for the temporary expanded search keywords "hotel, monthly", "hotel, weekend", and "hotel, weekly", for example, is 17, 57, and 23, respectively, and "monthly", "weekend", and "weekly" are employed as adjacent words.

After step S606, the adjacent word extraction unit 20C determines whether the number of adjacent words employed in step S606 has reached a third threshold (e.g., three) (S607). If the number of adjacent words employed is smaller than the third threshold (NO in S607), step S601 is performed again. If the number of adjacent words employed has reached the third threshold (YES in S607), the adjacent word extraction unit 20C outputs the employed adjacent words "monthly", "weekend", and "weekly" to the conversion unit 22 (S305).

In FIG. 12, after step S501, the conversion unit 22 of the word expanding apparatus 100 converts the adjacent words extracted by the adjacent word extraction unit 20C into a format suitable for a search and outputs the adjacent words to the output unit 24 as adjacent keywords (S104). The conversion unit 22 outputs the adjacent words "monthly", "weekend", and "weekly", for example, as adjacent keywords.

Next, the output unit 24 of the word expanding apparatus 100 outputs words for a search, which are a combination of the search keyword "hotel" received by the reception unit 14 and the adjacent keywords "monthly", "weekend", and "weekly" obtained as a result of the conversion performed by the conversion unit 22, to the search service providing apparatus 12 (refer to FIG. 2) as expanded search keywords (S105). The output unit 24 outputs at least one of "hotel, monthly", "hotel, weekend", and "hotel, weekly" as expanded search keywords.

The adjacent words "monthly", "weekend", and "weekly" indicate that the user 4 likes staying at a hotel for a long period of time for vacation. The expanded search keywords therefore include adjacent keywords relating to a hotel where the user 4 can stay for a long period of time.

4-3. Advantageous Effects

The adjacent word extraction unit 20C can exclude adjacent words that yield few search results by checking the number of search results in advance using the adjacent words extracted in step S304. As a result, search results can be narrowed down more accurately.

Modifications

Although the method for expanding a word and the like according to one or a plurality of aspects have been described on the basis of the first to fourth embodiments, the present disclosure is not limited to the first to fourth embodiments. Modes obtained by modifying the embodiments in ways conceivable by those skilled in the art and modes constructed by combining components in different embodiments may be included in the one or plurality of aspects insofar as the scope of the present disclosure is not deviated from.

Although semantic distances in a concept map are represented by integers from 0 to 10 in the above embodiments, semantic distances are not limited to this. For example, semantic distances may be represented by decimals from 0.0 to 1.0, instead.

Although smaller values of semantic distance indicate that a plurality of second words are semantically close to each other in the above embodiments, the meaning of semantic distance is not limited to this. For example, larger values of semantic distance may indicate that a plurality of general words are semantically close to each other, instead.

In the above embodiments, the components may be achieved by dedicated hardware or by executing software programs suitable therefor. The components may be achieved by reading and executing software programs recorded in a recording medium such as a hard disk or a semiconductor memory using a program execution unit such as a central processing unit (CPU) or a processor.

Some or all of the components included in each of the above-described apparatuses may be achieved by an integrated circuit (IC) card or a separate module removably attached to the apparatus. The IC card or the module is a computer system including a microprocessor, a read-only memory (ROM), and a random-access memory (RAM). The IC card or the module may include an ultra-multifunctional large-scale integration (LSI) circuit. The microprocessor operates in accordance with a computer program to cause the IC card or the module to achieve functions thereof. The IC card or the module may be tamper-resistant.

The present disclosure may be the above-described method. The present disclosure may be a computer program for causing a computer to implement the method or may be a digital signal including the computer program. In addition, the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, the present disclosure may be the digital signal recorded in the recording medium. In addition, the present disclosure may be implemented by transmitting the computer program or the digital signal through an electrical communication line, a wireless or wired communication line, a network typified by the Internet, datacasting, or the like. In addition, the present disclosure may be a computer system including a microprocessor and a memory. The memory may store the computer program, and the microprocessor may operate in accordance with the computer program. In addition, the present disclosure may be implemented by another independent computer system after the program or the digital signal is recorded in the recording medium and transported or after the program or the digital signal is transported through the network or the like.

The method for expanding a word in the present disclosure is effective, for example, in a search system or the like used by a user to search for information regarding a product, a service, or the like using an online search service.

What is claimed is:

1. A method for expanding a word performed by a processor, the method comprising:
   obtaining a first word;
   obtaining, from a memory, a concept map that is unique to a user and that includes a plurality of second words and semantic distances between the plurality of second words, the plurality of second words including words belonging to different categories;
if the plurality of second words include a word corresponding to the first word:
    determining the word corresponding to the first word as a basic word;
if the plurality of second words do not include a word corresponding to the first word:
    referring to a paraphrase list including at least one associated word associated with one of the plurality of second words;
    determining an associated word from the paraphrase list that is associated with the first word; and
    determining a second word from the plurality of second words that corresponds to the determined associated word as the basic word;
selecting, on the basis of the semantic distances between the basic word and the plurality of second words, at least one of the plurality of second words included in the concept map as an adjacent word; and
outputting a result of a search on the basis of the first word and the adjacent word.

2. The method according to claim 1, wherein
if there is no associated word associated with the first word in the paraphrase list:
extracting a third word on the basis of a result of a search performed using the first word; and
determining a second word associated with the third word as the basic word among the plurality of second words included in the concept map.

3. The method according to claim 1,
wherein the selecting of the at least one of the plurality of second words comprises selecting at least one second word from the plurality of second words included in the concept map as the adjacent word, a semantic distance between the basic word and the at least one second word being equal to or smaller than a first threshold.

4. The method according to claim 3, wherein if
semantic distances between the basic word and a plurality of second words are equal to or smaller than the first threshold and the plurality of second words are extracted from the concept map, the selecting of the at least one of the plurality of second words further comprises:
obtaining a number of search results, which is a result of a search performed on the basis of the first word and each of the plurality of second words extracted; and
selecting a second word having the number of search results equal to or larger than a second threshold as the adjacent word from the plurality of second words extracted.

5. The method according to claim 1,
wherein the concept map is generated on the basis of a result of measurement of changes in blood flow of a brain, changes in electric potential, or changes in a magnetic field.

6. The method according to claim 5,
wherein the concept map is generated on the basis of the result of the measurement of changes in the blood flow of the brain, changes in the electric potential, or changes in the magnetic field through functional magnetic resonance imaging.

7. A word expanding apparatus comprising:
a processor; and
a memory,
wherein the processor
obtains a first word;
obtains, from a memory, a concept map that is unique to a user and that includes a plurality of second words and semantic distances between the plurality of second words, the plurality of second words including words belonging to different categories;
if the plurality of second words include a word corresponding to the first word:
    determines the word corresponding to the first word as a basic word;
if the plurality of second words do not include a word corresponding to the first word:
    refers to a paraphrase list including at least one associated word associated with one of the plurality of second words;
    determines an associated word from the paraphrase list that is associated with the first word; and
    determines a second word from the plurality of second words that corresponds to the determined associated word as the basic word;
selects, on the basis of the semantic distances between the basic word and the plurality of second words, at least one of the plurality of second words included in the concept map as an adjacent word; and
outputs words for a search on the basis of the first word and the adjacent word.

8. The word expanding apparatus according to claim 7 wherein
if there is no associated word associated with the first word in the paraphrase list, the processor:
extracts a third word on the basis of a result of a search performed using the first word; and
determines a second word associated with the third word as the basic word among the plurality of second words included in the concept map.

9. The word expanding apparatus according to claim 7,
wherein the processor selects at least one second word from the plurality of second words included in the concept map as the adjacent word, a semantic distance between the basic word and the at least one second word being equal to or smaller than a first.

10. The method according to claim 9, wherein if
semantic distances between the basic word and a plurality of second words are equal to or smaller than the first threshold and the plurality of second words are extracted from the concept map, the processor:
obtains a number of search results, which is a result of a search performed on the basis of the first word and each of the plurality of second words extracted; and
selects a second word having the number of search results equal to or larger than a second threshold as the adjacent word from the plurality of second words extracted.

11. The word expanding apparatus according to claim 7,
wherein the concept map is generated on the basis of a result of measurement of changes in blood flow of a brain, changes in electric potential, or changes in a magnetic field.

12. The word expanding apparatus according to claim 11,
wherein the concept map is generated on the basis of the result of the measurement of changes in the blood flow of the brain, changes in the electric potential, or changes in the magnetic field through functional magnetic resonance imaging.

13. A non-transitory computer-readable recording medium storing a control program for causing a device including a processor to perform operations comprising:

obtaining a first word;

obtaining, from a memory, a concept map that is unique to a user and that includes a plurality of second words and semantic distances between the plurality of second words, the plurality of second words including words belonging to different categories;

if the plurality of second words include a word corresponding to the first word:
- determining the word corresponding to the first word as a basic word;

if the plurality of second words do not include a word corresponding to the first word:
- referring to a paraphrase list including at least one associated word associated with one of the plurality of second words;
- determining an associated word from the paraphrase list that is associated with the first word; and
- determining a second word from the plurality of second words that corresponds to the determined associated word as the basic word;

selecting, on the basis of the semantic distances between the basic word and the plurality of second words, at least one of the plurality of second words included in the concept map as an adjacent word; and outputting a result of a search on the basis of the first word and the adjacent word.

* * * * *